(12) United States Patent
Griffin et al.

(10) Patent No.: US 11,290,368 B2
(45) Date of Patent: Mar. 29, 2022

(54) FEDERATED MESSAGING FOR QUANTUM SYSTEMS THROUGH TELEPORTATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 283 days.

(21) Appl. No.: 16/418,572

(22) Filed: May 21, 2019

(65) Prior Publication Data

US 2020/0374211 A1    Nov. 26, 2020

(51) Int. Cl.
*H04L 12/715* (2013.01)
*H04L 45/00* (2022.01)
*G06N 10/00* (2022.01)
*H04L 45/745* (2022.01)

(52) U.S. Cl.
CPC ............ *H04L 45/04* (2013.01); *G06N 10/00* (2019.01); *H04L 45/745* (2013.01)

(58) Field of Classification Search
None
See application file for complete search history.

(56) References Cited

U.S. PATENT DOCUMENTS

2016/0197723 A1* 7/2016 Takahashi ............. H04L 9/0855
380/255
2020/0244373 A1* 7/2020 Huberman ......... H04Q 11/0062

FOREIGN PATENT DOCUMENTS

| CN | 107070796 A | 8/2017 |
| CN | 105099902 B | 4/2018 |
| CN | 104883304 B | 7/2018 |
| CN | 104754688 B | 9/2018 |
| WO | 2016206498 A1 | 12/2016 |

OTHER PUBLICATIONS

A Pirker, A quantum network stack and protocols for reliable entanglement based networks, New Journal of Physics, pp. 1-30, Mar. 2019 (Year: 2019).*
Rodney Van Meter, Recursive quantum repeater networks, Progress in informations, No. 8, pp. 65-79, 2011 (Year: 2011).*

(Continued)

*Primary Examiner* — Steven H Nguyen
(74) *Attorney, Agent, or Firm* — Withrow & Terranova, PLLC

(57) ABSTRACT

Federated messaging for quantum systems through teleportation is disclosed. In one example, a first routing service of a first quantum computing device receives a routing request comprising a payload qubit and an identifier of a destination service of a second quantum computing device. The first routing service identifies a routing entry of a routing table corresponding to the destination service. A first teleporting service of the first quantum computing device is identified based on the routing entry, the first teleporting service being associated with a first qubit entangled with a second qubit of a second teleporting service of the second quantum computing device. The first routing service routes the routing request to the first teleporting service, which generates quantum state data for the payload qubit using the payload qubit and the first qubit. The quantum state data is then sent to the second teleporting service via a communications network.

17 Claims, 11 Drawing Sheets

(56) References Cited

OTHER PUBLICATIONS

Mina, Mihai-Zicu, et al., "EntangleNet: Theoretical Reestablishment of Entanglement in Quantum Networks," Applied Sciences, vol. 8, Oct. 16, 2018, 17 pages.
Schoute, Eddie, et al., "Shortcuts to Quantum Network Routing," Jul. 8, 2016, Cornell University, 2 pages.
Ku-Tao, Yu, et al., "Distributed wireless quantum communication networks," Chinese Physics B, vol. 22, Issue 9, 2013, Chinese Physical Society and IOP Publishing Ltd., 7 pages.

* cited by examiner

| ROUTING ENTRY 46(0) | | | |
|---|---|---|---|
| IDENTIFIER OF SERVICE 50 | IDENTIFIER OF QUBIT 52 | IDENTIFIER OF QUANTUM COMPUTING DEVICE 54 | INDICATOR OF ENTANGLEMENT STATE 56 | IDENTIFIER OF QUANTUM COMPUTING DEVICE OF ENTANGLED QUBIT 58 |

FIG. 2

FEDERATED MESSAGING FOR QUANTUM SYSTEMS THROUGH TELEPORTATION

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Entangled qubits may be used in combination with classical communication to accomplish "teleportation," a process in which quantum state information for a qubit may be transmitted from one location to another without transmitting the qubit's underlying particle.

SUMMARY

The examples disclosed herein relate to federated messaging for quantum systems through teleportation. In one example, a first quantum computing device provides a routing service that uses a routing table comprising a plurality of routing entries to efficiently route qubits to services of other quantum computing devices using teleportation. The routing service receives a routing request from a sending service of the first quantum computing device, where the routing request includes a payload qubit (i.e., a qubit to be teleported) and an identifier of a destination service on a second quantum computing device. The routing service next identifies a routing entry of the routing table that corresponds to the destination service, and further identifies a first teleportation service on the first computing device that is associated with a first qubit that is entangled with a second qubit associated with a second teleportation service of the second quantum computing device. The routing service then routes the routing request to the first teleportation service, which generates quantum state data for the payload qubit using the payload qubit and the first entangled qubit. The quantum state data is then sent to the second quantum computing device, where the quantum state data may be applied to the second entangled qubit to create an identical copy of the payload qubit. Teleportation thus may be used to efficiently transfer qubits among quantum computing devices in a federated, cross-domain manner without needing to physically transport the qubits themselves.

In another example, a method is provided. The method comprises receiving, by a first routing service of a first quantum computing device, a routing request from a sending service of the first quantum computing device, wherein the routing request comprises a payload qubit and an identifier of a destination service of a second quantum computing device. The method further comprises identifying, by the first routing service, a routing entry of a plurality of routing entries of a routing table, wherein the routing entry corresponds to the destination service. The method also comprises identifying, based on the routing entry, a first teleporting service of the first quantum computing device, wherein the first teleporting service is associated with a first qubit in an entangled state with a corresponding second qubit associated with a second teleporting service of the second quantum computing device. The method additionally comprises routing, by the first routing service, the routing request to the first teleporting service. The method further comprises generating, by the first teleporting service using the payload qubit and the first qubit, quantum state data for the payload qubit. The method also comprises sending, by the first teleporting service, the quantum state data to the second teleporting service via a communications network.

In another example, a computing system is provided. The computing system includes a first quantum computing device that comprises a first system memory and a first quantum processor device coupled to the first system memory. The computing system further includes a second quantum computing device that comprises a second system memory and a second quantum processor device coupled to the second system memory. The first quantum processor device is to receive, using a first routing service of the first quantum processor device, a routing request from a sending service of the first quantum processor device, wherein the routing request comprises a payload qubit and an identifier of a destination service of the second quantum processor device. The first quantum processor device is further to identify, using the first routing service, a routing entry of a plurality of routing entries of a routing table, wherein the routing entry corresponds to the destination service. The first quantum processor device is also to identify, based on the routing entry, a first teleporting service of the first quantum processor device, wherein the first teleporting service is associated with a first qubit in an entangled state with a corresponding second qubit associated with a second teleporting service of the second quantum processor device. The first quantum processor device is additionally to route, using the first routing service, the routing request to the first teleporting service. The first quantum processor device is further to generate, using the teleporting service using the payload qubit and the first qubit, quantum state data for the payload qubit. The first quantum processor device is also to send, using the first teleporting service, the quantum state data to the second teleporting service via a communications network.

In another example, a computer program product stored on a non-transitory computer-readable storage medium is provided. The computer-readable storage media includes instructions to cause a quantum processor device to receive, by a first routing service of the quantum processor device, a routing request from a sending service of the quantum processor device, wherein the routing request comprises a payload qubit and an identifier of a destination service of a second quantum processor device. The instructions further cause the quantum processor device to identify, by the first routing service, a routing entry of a plurality of routing entries of a routing table, wherein the routing entry corresponds to the destination service. The instructions also cause the quantum processor device to identify, based on the routing entry, a first teleporting service of the quantum processor device, wherein the first teleporting service is associated with a first qubit in an entangled state with a corresponding second qubit associated with a second teleporting service of the second quantum processor device. The instructions additionally cause the quantum processor device to route, by the first routing service, the routing request to the first teleporting service. The instructions further cause the quantum processor device to generate, by the teleporting service using the payload qubit and the first qubit, quantum state data for the payload qubit. The instructions also cause the quantum processor device to send, by the first teleporting service, the quantum state data to the second teleporting service via a communications network.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a block diagram illustrating contents of a routing entry of the routing table of FIG. 1, according to one example;

DETAILED DESCRIPTION

Figure 1:
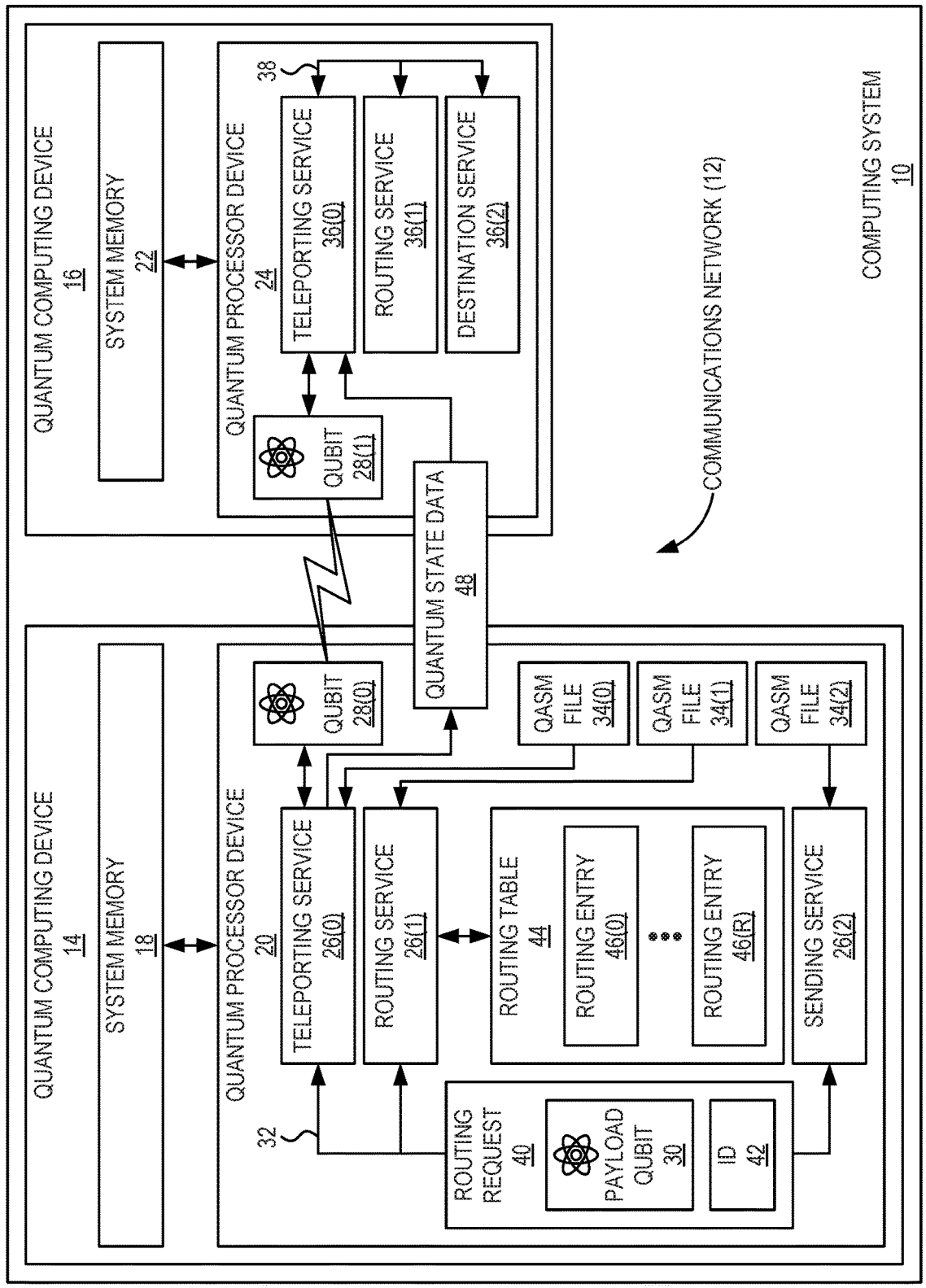
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits." A qubit encodes quantum information for an underlying particle such as an atom or a photon, and possesses characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

One application for the phenomenon of entanglement is quantum "teleportation" of a qubit. As used herein, teleportation refers to a process in which an entangled pair of qubits may be used to transmit quantum state information for a payload qubit (i.e., a qubit to be teleported) from one location to another, without having to transmit the payload qubit's underlying particle. To perform teleportation of a payload qubit, a pair of entangled qubits A and B are first generated, and the entangled qubits A and B are sent to a sending quantum computing device and a receiving quantum computing device, respectively. At the sending quantum computing device, a Bell measurement operation is performed using the payload qubit and the entangled qubit A. The Bell measurement operation on the payload qubit and the entangled qubit A results in one (1) of four (4) measurement outcomes and, due to the state of entanglement existing between qubit A and qubit B, also leaves qubit B in one (1) of four (4) possible states. The Bell measurement outcome is subsequently encoded using two (2) classical bits of information, which are then transmitted from the sending quantum computing device to the receiving quantum computing device. Based upon the two (2) classical bits encoding the measurement outcome, the receiving quantum computing device may modify the entangled qubit B to result in a qubit that is identical to the payload qubit. In this manner, the payload qubit can be "teleported" from the sending quantum computing device to the receiving quantum computing device, without having to physically transport the particle underlying the payload qubit.

Teleportation can be leveraged to rapidly transfer qubits at speeds up to but no faster than the speed of light. However, to maximize the benefits of messaging using teleportation, it is desirable to provide mechanisms for automatically and efficiently routing qubits between services of quantum computing devices, in a manner that minimizes routes between systems.

In this regard, the examples herein relate to federated messaging between quantum systems (e.g., quantum computing devices) using teleportation. In some examples, a first quantum computing device provides a routing service that accesses a routing table comprising a plurality of routing entries. Each routing entry associates a service of a quantum computing device with a qubit, provides an indication regarding whether that qubit is in an entangled state and, if so, identifies a quantum computing device maintaining the other entangled qubit. The routing service receives a routing request from a sending service of the first quantum computing device, where the routing request includes a payload qubit (i.e., a qubit to be teleported) and an identifier of a destination service on a second quantum computing device. The routing service next identifies a routing entry of the routing table that corresponds to the destination service, and further identifies a first teleportation service on the first computing device that is associated with a first qubit entangled with a second qubit associated with a second teleportation service of the second quantum computing device. The routing service then routes the routing request to the first teleportation service, which generates quantum state data for the payload qubit using the payload qubit and the first entangled qubit. The quantum state data is then sent to the second quantum computing device, where the quantum state data may be applied to the second entangled qubit to create an identical copy of the payload qubit. In this manner, teleportation may be used to efficiently route qubits among quantum computing devices in a federated, cross-domain manner, without needing to physically transport the qubits themselves.

FIG. 1 is a block diagram of a computing system 10 in which examples may be practiced. The computing system 10 includes a communications network 12, through which a quantum computing device 14 is communicatively coupled to a quantum computing device 16. As seen in FIG. 1, the quantum computing device 14 includes a system memory 18 and a quantum processor device 20, while the quantum computing device 16 includes a system memory 22 and a quantum processor device 24. It is to be understood that the computing system 10 according to some examples may include other classical computing devices and/or additional quantum computing devices that are not illustrated in FIG. 1. Additionally, the quantum computing device 14 and the quantum computing device 16 in some examples may include constituent elements in addition to those illustrated in FIG. 1.

The quantum processor device 20 of the quantum computing device 14 provides a plurality of services 26(0)-26(2) for processing and handling qubits. The plurality of services 26(0)-26(2) include a teleporting service 26(0), a routing service 26(1), and a sending service 26(2), the functionality of each of which is discussed in greater detail below. Each of the services 26(0)-26(2) may be associated with one or more qubits. For example, as seen in FIG. 1, the teleporting service 26(0) is associated with a qubit 28(0) that is in an entangled state with a qubit 28(1), and the sending service 26(2) is associated with a payload qubit 30 (i.e., a qubit to be teleported). The plurality of services 26(0)-26(2) are communicatively coupled to each other via a quantum channel 32, which in some examples comprises a message bus that is configured to transport qubits and classical bits, and on which each of the services 26(0)-26(2) listens. In the example of FIG. 1, each of the plurality of services 26(0)-26(2) is associated with a corresponding QASM file 34(0)-34(2), which is used to allocate, initialize, and/or entangle one or more qubits for use by the respective services 26(0)-26(2). The quantum computing device 16 also provides a plurality of services 36(0)-36(2), including a teleporting service 36(0), a routing service 36(1), and a destination service 36(2), interconnected via a quantum channel 38. The services 36(0)-36(2) of the quantum computing device 16 are similarly associated with corresponding QASM files (not shown).

As noted above, the pair of entangled qubits 28(0) and 28(1) is maintained by the quantum computing devices 14 and 16, respectively. According to some examples, prior to the computing system 10 performing teleportation, an entangled state is induced between the qubits 28(0) and 28(1), with the qubit 28(0) subsequently being sent to the quantum computing device 14 and the qubit 28(1) being sent to the quantum computing device 16. Inducing the entangled state between the qubit 28(0) and the qubit 28(1) may be performed, e.g., by a quantum computing device using Quantum Assembly (QASM) files to apply a Hadamard gate to the qubit 28(0) to place it a state of superposition, and then apply a CNOT gate to the qubit 28(1), as a non-limiting example. Qubits such as the qubits 28(0) and 28(1) may be transferred among the quantum computing device 14 and the quantum computing device 16 in the form of photons transmitted via fiber optic cabling or through free space using pulsed lasers, as non-limiting examples.

The sending service 26(2) of the quantum computing device 14 may seek to teleport the payload qubit 30 to the destination service 36(2) of the quantum computing device 16. For instance, in one possible use case, the payload qubit 30 may be used as part of a quantum-based encryption mechanism, and the sending service 26(2) may seek to transmit the payload qubit 30 to the destination service 36(2) to enable use of the quantum-based encryption mechanism by the destination service 36(2). Accordingly, the sending service 26(2) generates a routing request 40, which includes the payload qubit 30 and an identifier ("ID") 42 of the destination service 36(2). The sending service 26(2) sends the routing request 40 onto the quantum channel 32, from which it is received by the routing service 26(1).

The routing service 26(1) is responsible for identifying a service on the quantum computing device 14 that may be used to teleport the payload qubit 30 to the destination service 36(2). To accomplish this, the routing service 26(1) first accesses a routing table 44 comprising a plurality of routing entries 46(0)-46(R). As discussed in greater detail below with respect to FIG. 2, the routing entries 46(0)-46(R) each corresponds to a qubit, including the entangled qubit 28(0), the entangled qubit 28(1), and the payload qubit 30, and also links the services 26(0)-26(2), 36(0)-36(2) with their associated qubits. Each of the routing entries 46(0)-46(R) also identifies a quantum computing device (e.g., the quantum computing device 14 or the quantum computing device 16) for each service 26(0)-26(2), 36(0)-36(2), and indicates whether the qubit corresponding to the routing entry 46(0)-46(R) is in an entangled state with another qubit. If so, the routing entry 46(0)-46(R) also indicates the quantum computing device that maintains the entangled qubit. In some examples, the routing entries 46(0)-46(R) of the routing table 44 are populated by the routing service 26(1), based on the QASM files 34(0)-34(2). For instance, as each of the QASM files 34(0)-34(2) for the services 26(0)-26(2) are invoked, the quantum processor device 20 may provide the QASM file 34(0)-34(2) to the routing service 26(1), which may analyze the QASM file 34(0)-34(2) and generate a corresponding routing entry of the routing entries 46(0)-46(R).

The routing service 26(1) identifies a routing entry corresponding to the destination service 36(2) among the plurality of routing entries 46(0)-46(R) in the routing table 44 (e.g., using the identifier 42 of the routing request 40 received from the sending service 26(2)). Based on the identified routing entry, the routing service 26(1) then identifies the teleporting service 26(0) as being associated with the qubit 28(0) that is entangled with the qubit 28(1) of the quantum computing device 16 on which the destination service 36(2) resides (e.g., based on locating a routing entry of the plurality of routing entries 46(0)-46(R) corresponding to the teleporting service 26(0)). The routing service 26(1) next routes the routing request 40 to the teleporting service 26(0).

Upon receiving the routing request 40, the teleporting service 26(0) uses the payload qubit 30 and the entangled qubit 28(0) to generate quantum state data 48 for the payload qubit 30. According to some examples, generating the quantum state data 48 may include performing a Bell measurement operation using the payload qubit 30 and the entangled qubit 28(0), and encoding the outcome of the Bell measurement operation as two classical bits of information constituting the quantum state data 48. The teleporting service 26(0) then sends the quantum state data 48 to the quantum computing device 16 via the communications network 12.

In the example of FIG. 1, the quantum state data 48 is received by the teleporting service 36(0) of the quantum computing device 16. The teleporting service 36(0) then applies the quantum state data 48 to the entangled qubit 28(1) to teleport the payload qubit 30. Applying the quantum state data 48 to the entangled qubit 28(1) according to some examples may comprise performing operations indicated by the quantum state data 48 to modify the entangled qubit 28(1) to result in a qubit that is identical to the payload qubit 30. The teleporting service 36(0) then sends the qubit 28(1) to the routing service 36(1) via the quantum channel 38, and the routing service 36(1) sends the qubit 28(1) to the destination service 36(2).

To illustrate the contents of the routing entries 46(0)-46(R) of the routing table 44 of FIG. 1 according to one example, FIG. 2 is provided. As seen in FIG. 2, the constituent fields of the routing entry 46(0) are shown. The routing entry 46(0) in this example includes an identifier 50 of a service (e.g., one of the services 26(0)-26(2) or the services 36(0)-36(2), as non-limiting examples) with which a qubit is associated, and also includes an identifier 52 of the qubit. Additionally, the routing entry 46(0) includes an identifier 54 of the quantum computing device (e.g., one of the quantum computing device 14 and the quantum computing device 16, as non-limiting examples) corresponding to the service and the qubit, and provides an indicator 56 of the entanglement state of the qubit. For example, the indicator 56 may comprise a binary flag indicating whether or not the corresponding qubit is in an entangled state. Finally, if the qubit corresponding to the routing entry 46(0) is in an entangled state, the routing entry 46(0) provides an identifier 58 of the quantum computing device that maintains the entangled qubit. Although not shown in FIG. 2, it is to be understood that the routing entries 46(1)-46(R) each includes fields corresponding to those illustrated in FIG. 2 for the routing entry 46(0).

Figure 3A:
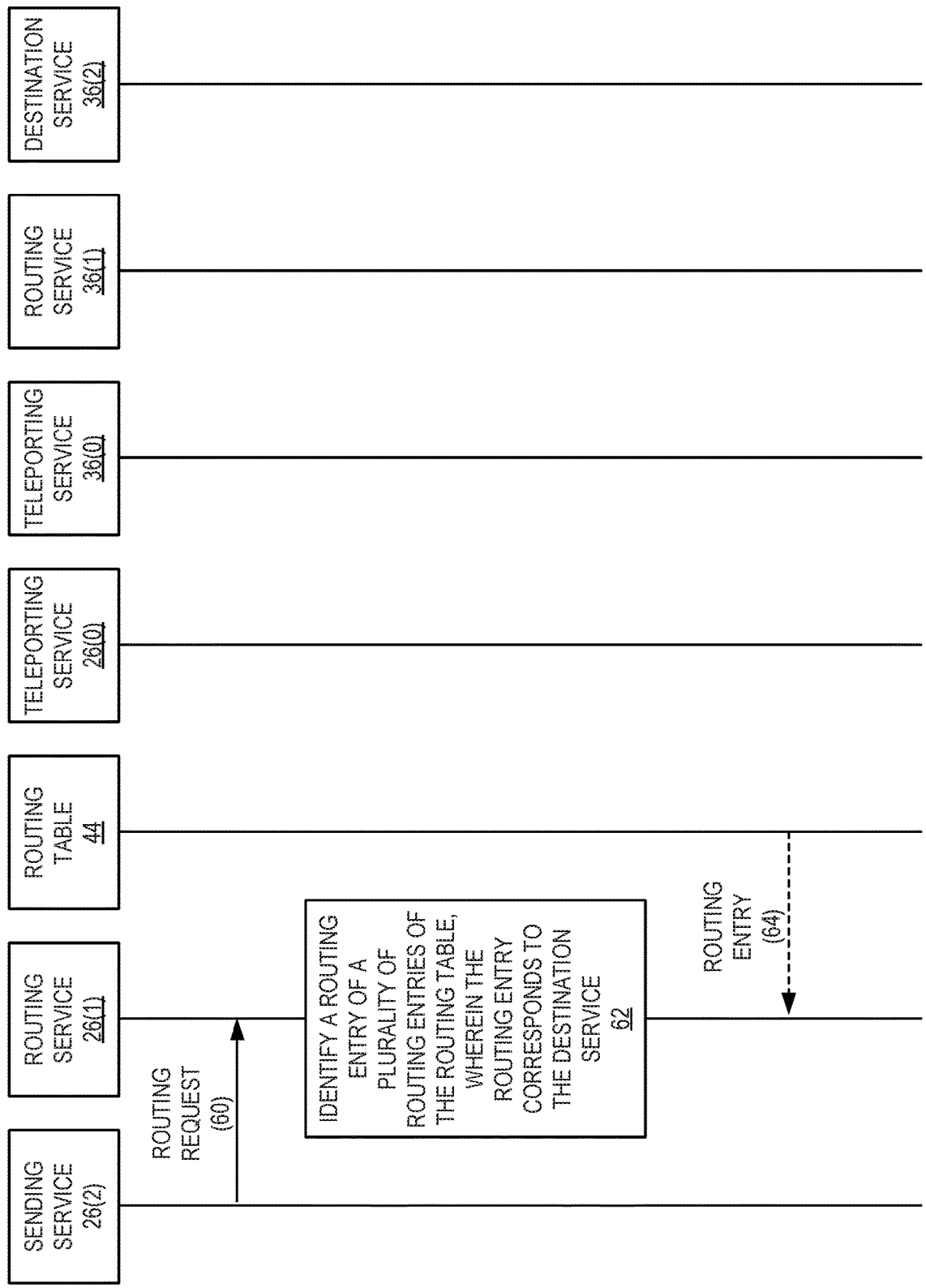
FIGS. 3A-3C are messaging diagrams illustrating communication flows among services of the quantum computing devices of FIG. 1 for providing federated messaging through teleportation, according to one example.
Figure 3B:
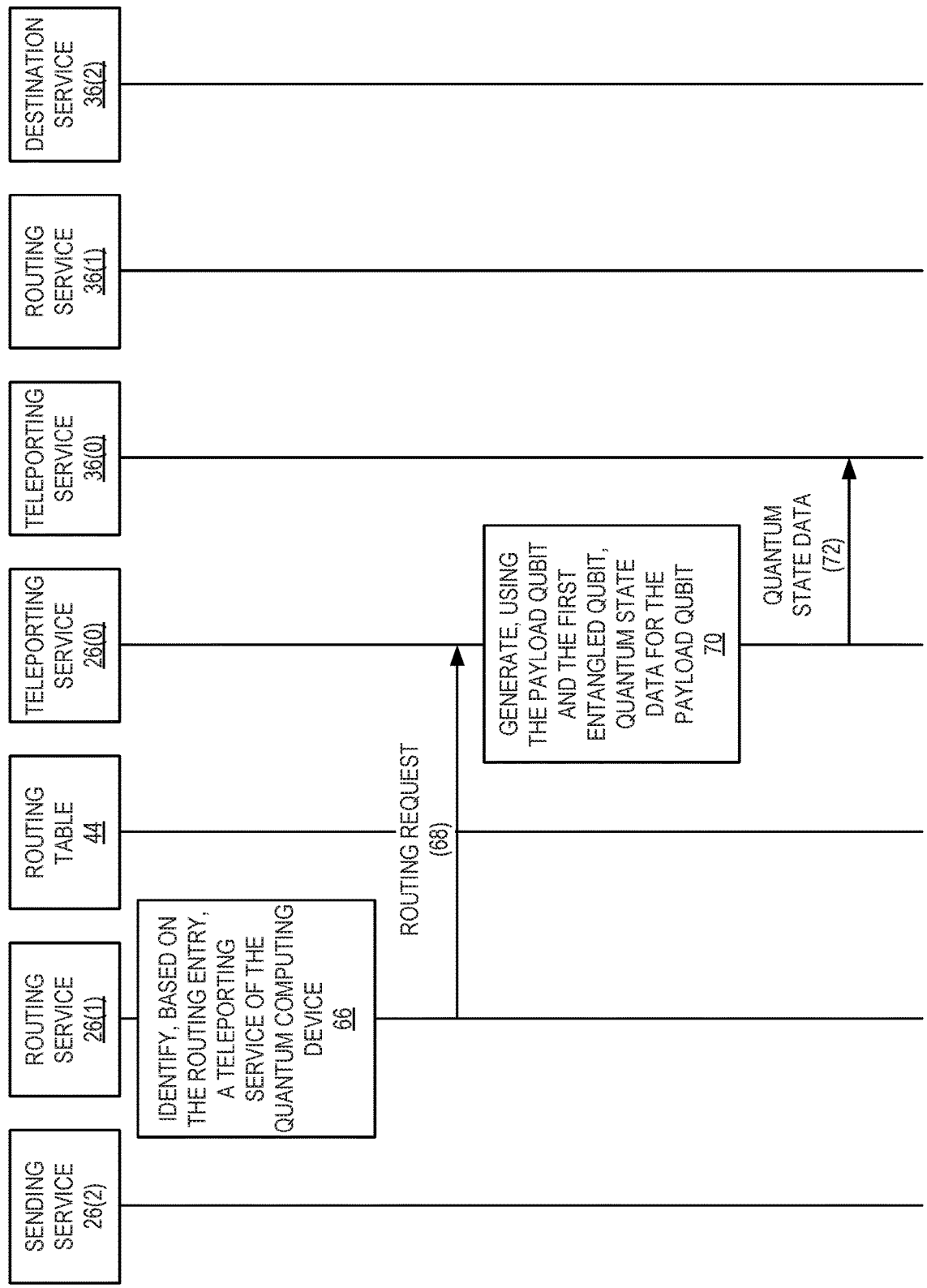
Figure 3C:
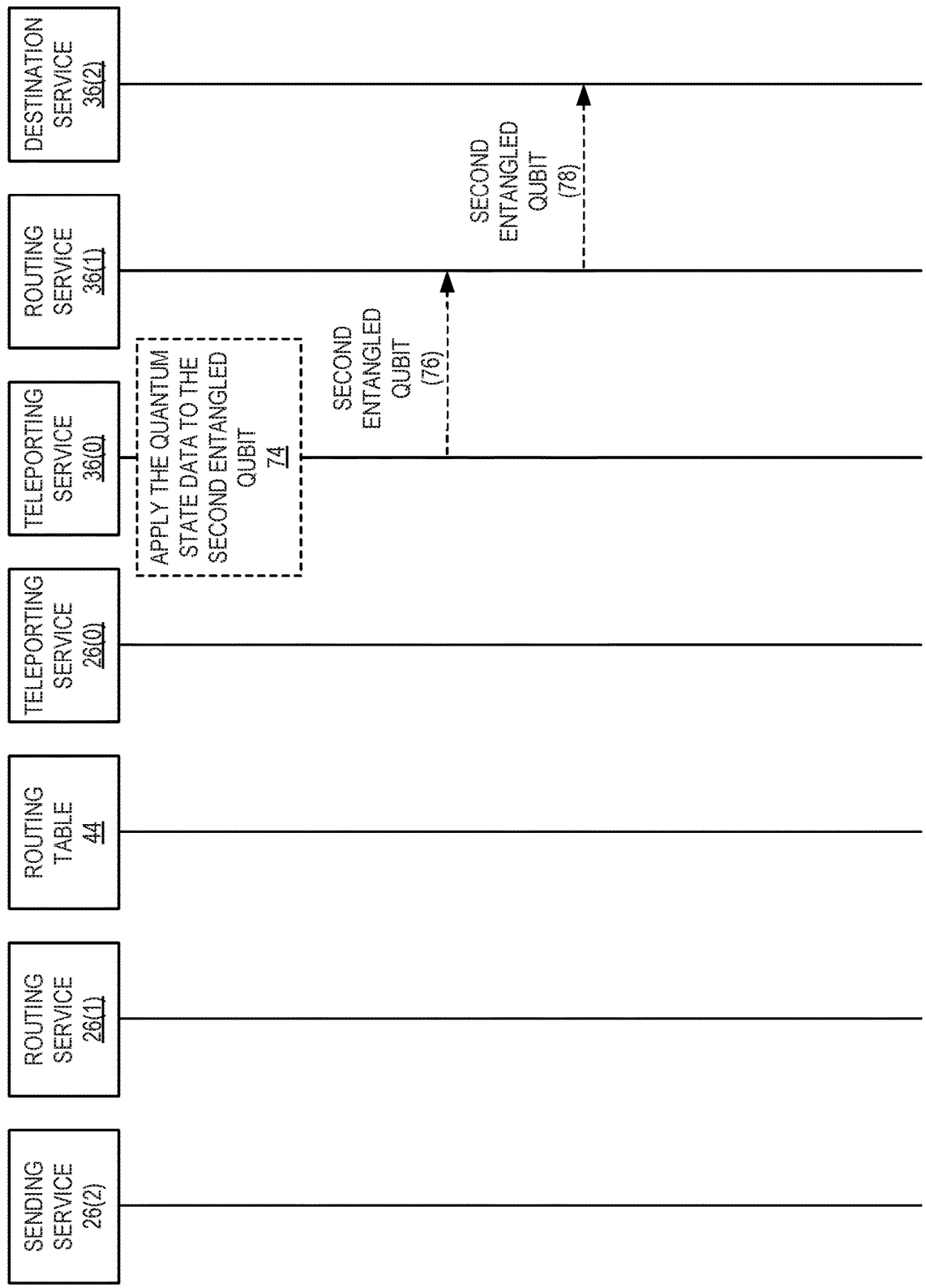

FIGS. 3A-3C illustrate communication flows among elements of the computing system 10 of FIG. 1 for providing federated messaging using teleportation, according to one example. Elements of FIG. 1 are referenced in describing FIGS. 3A-3C for the sake of clarity. As seen in FIGS. 3A-3C, each of the sending service 26(2), the routing service 26(1), the routing table 44, the teleporting service 26(0), the teleporting service 36(0), the routing service 36(1), and the destination service 36(2) is represented by vertical lines, with communications between these elements illustrated by captioned arrows, and operations performed by each element illustrated by captioned boxes.

In the example of FIG. 3A, operations begin with the routing service 26(1) receiving the routing request 40 from the sending service 26(2), as indicated by arrow 60. The routing service 26(1) identifies a routing entry (such as the routing entry 46(0)) of the plurality of routing entries 46(0)-46(R) of the routing table 44, wherein the routing entry 46(0) corresponds to the destination service 36(2), as indicated by block 62. The routing service 26(1) in some examples then retrieves the routing entry 46(0) from the routing table 44, as indicated by arrow 64. Processing then continues in FIG. 3B.

Referring now to FIG. 3B, the routing service 26(1) next identifies, based on the routing entry 46(0), a teleporting service, such as the teleporting service 26(0), of the local quantum computing device (i.e., the quantum computing device 14 of the routing service 26(1)), as indicated by block 66. According to some examples, the teleporting service 26(0) may be identified by locating a routing entry 46(0)-46(R) that is linked to a service associated with a qubit that is entangled with a qubit of the quantum computing device of the destination service 36(2). After identifying the teleporting service 26(0), the routing service 26(1) routes the routing request 40 to the teleporting service 26(0), as indicated by arrow 68.

The teleporting service 26(0) then generates, using the payload qubit 30 and a first entangled qubit such as the qubit 28(0), the quantum state data 48 for the payload qubit 30, as indicated by block 70. Some examples may provide that generating the quantum state data 48 may include performing a Bell measurement operation using the payload qubit 30 and the entangled qubit 28(0), and encoding the outcome of the Bell measurement operation as two (2) classical bits of information constituting the quantum state data 48. The teleporting service 26(0) then sends the quantum state data 48 to the teleporting service 36(0) of the quantum computing device 16 via the communications network 12, as indicated by arrow 72. Processing in some examples continues in FIG. 3C.

Turning now to FIG. 3C, some examples may provide that the teleporting service 36(0) of the quantum computing device 16 applies the quantum state data 48 to a second entangled qubit, such as the qubit 28(1), as indicated by block 74. Operations of block 74 for applying the quantum state data 48 to the qubit 28(1) may include performing operations indicated by the quantum state data 48 to modify the entangled qubit 28(1) to result in a qubit that is identical to the payload qubit 30. The teleporting service 36(0) may then send the second entangled qubit 28(1) to the routing service 36(1) of the quantum computing device 16, as indicated by arrow 76. The routing service 36(1) in turn may send the second entangled qubit 28(1) to the destination service 36(2), as indicated by arrow 78.

Figure 4A:
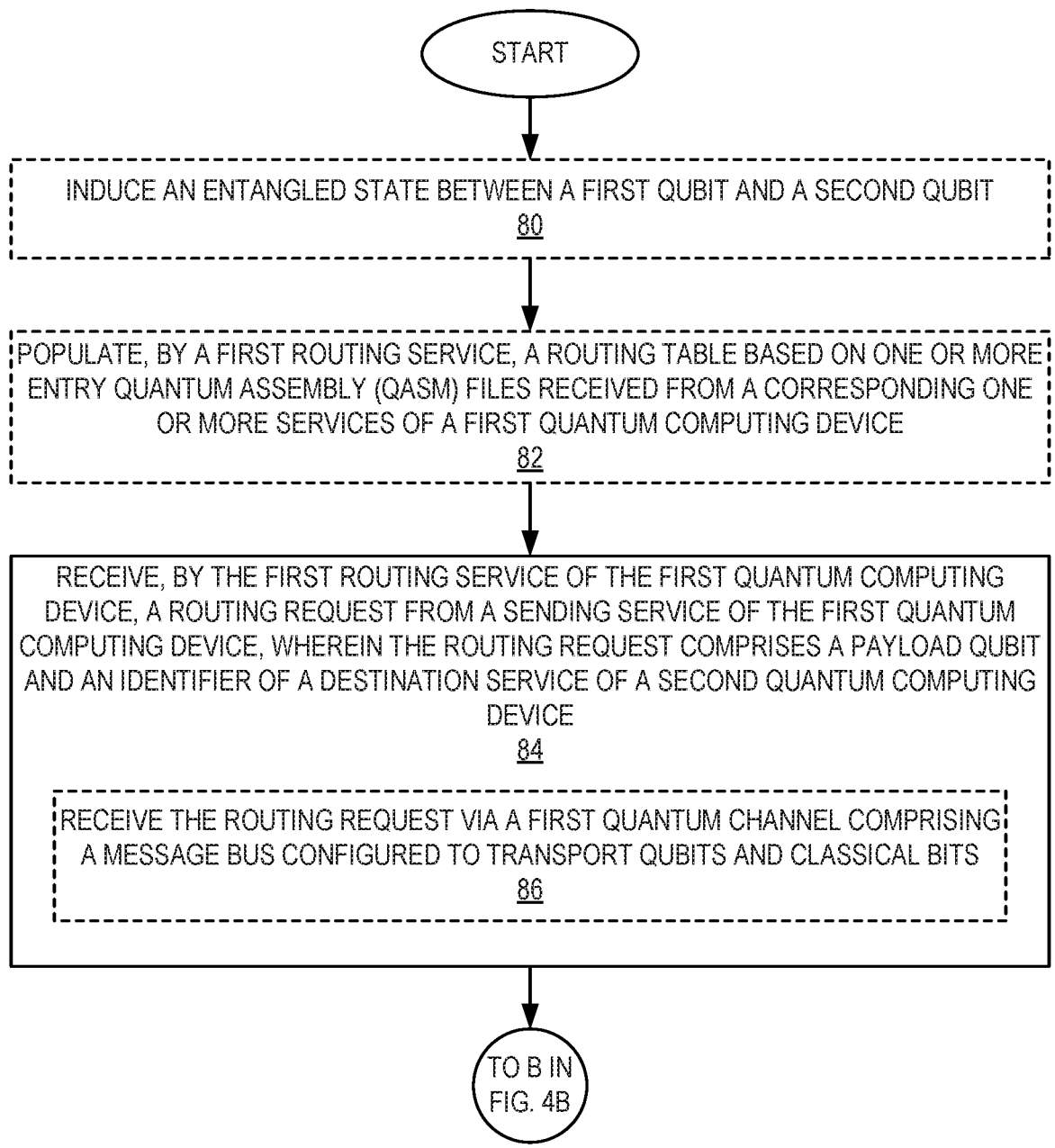
FIGS. 4A-4C are flowcharts illustrating operations for providing federated messaging through teleportation, according to one example.
Figure 4B:
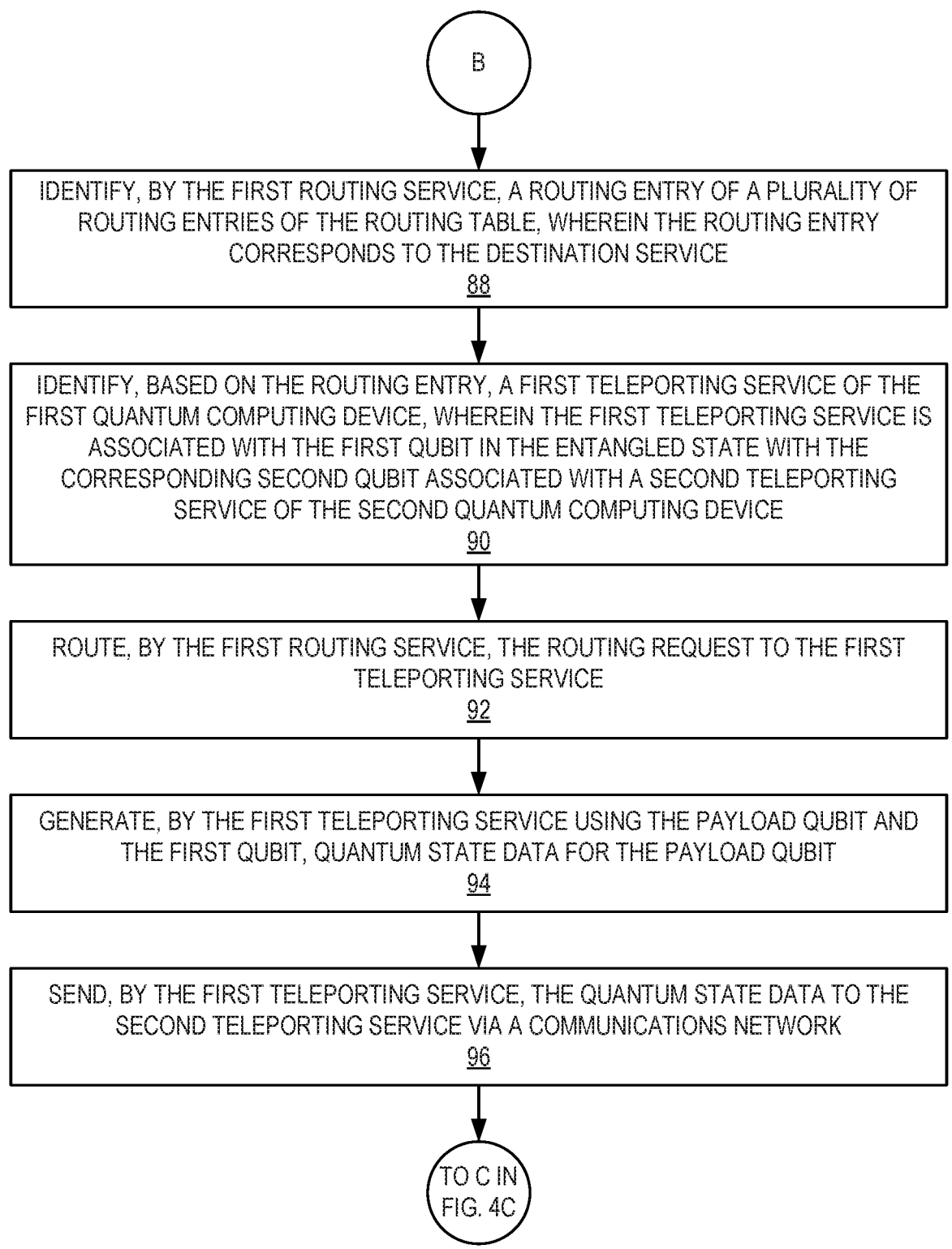
Figure 4C:
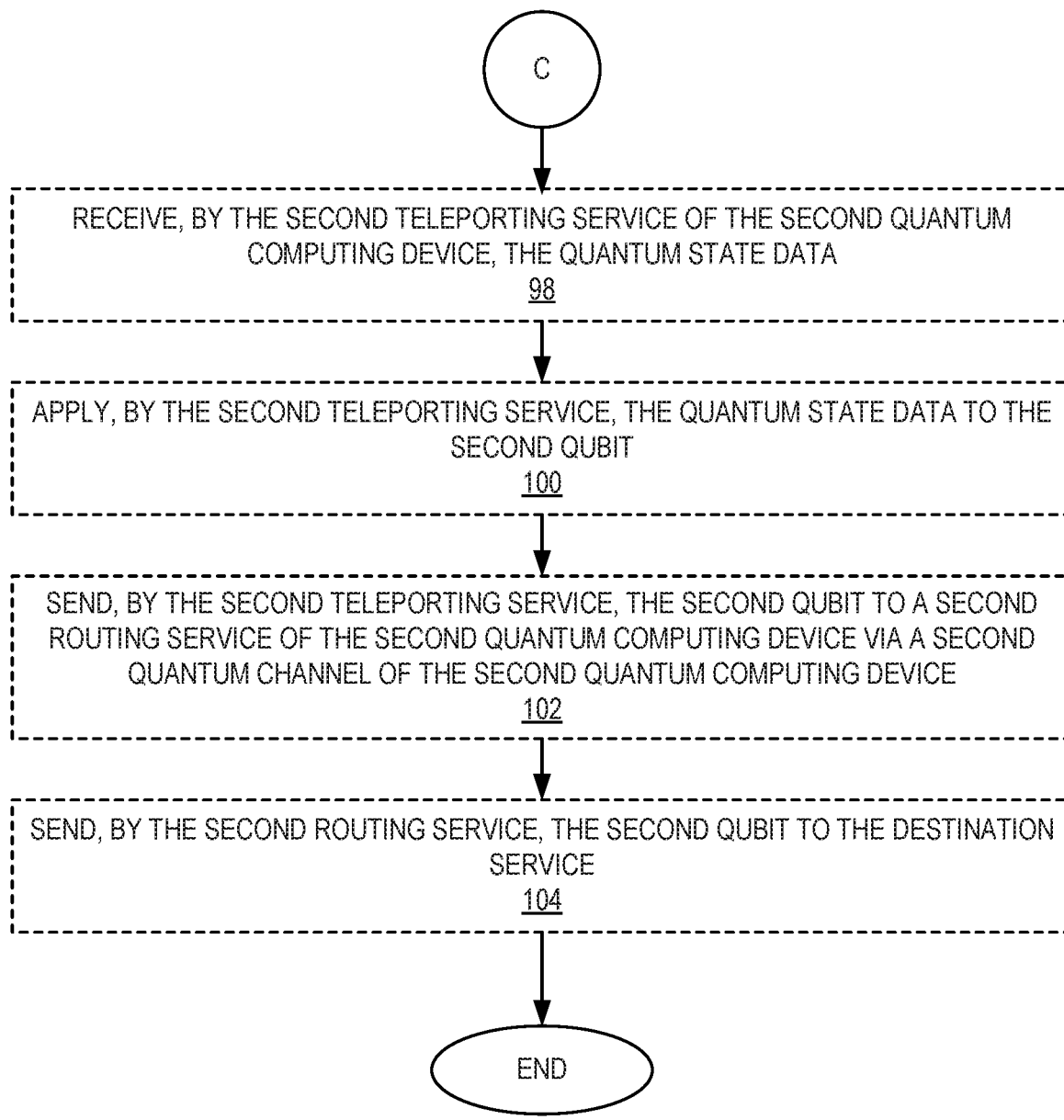

To illustrate operations for providing federated messaging using teleportation according to one example, FIGS. 4A-4C are provided. Elements of FIG. 1 are referenced in describing FIGS. 4A-4C for the sake of clarity. Operations according to some examples begin in FIG. 4A with an entangled state being induced (e.g., by a quantum computing device of the computing system 10, such as the quantum computing device 14 or the quantum computing device 16) between a first qubit (e.g., the qubit 28(0) of FIG. 1) and a second qubit (e.g., the qubit 28(1) of FIG. 1) (block 80). Some examples may also provide that a first routing service (such as the routing service 26(1) of FIG. 1) may populate the routing table 44 based on one or more entry QASM files (e.g., the QASM files 34(0)-34(2) of FIG. 1) received from a corresponding one or more services of a first quantum computing device (e.g., the services 26(0)-26(2) of the quantum computing device 14) (block 82).

The first routing service 26(1) receives a routing request, such as the routing request 40, from a sending service (e.g., the sending service 26(2)) of the first quantum computing device 14, wherein the routing request 40 comprises a payload qubit 30 and an identifier 42 of a destination service of a second quantum computing device (e.g., the destination service 36(2) of the quantum computing device 16) (block 84). In some examples, the operations of block 84 for receiving the routing request 40 may comprise receiving the routing request 40 via a first quantum channel, such as the quantum channel 32, comprising a message bus configured to transport qubits and classical bits (block 86). Processing then resumes at block 88 of FIG. 4B.

Referring now to FIG. 4B, the first routing service 26(1) identifies a routing entry, such as the routing entry 46(0), of the routing table 44, wherein the routing entry 46(0) corresponds to the destination service 36(2) (block 88). The first routing service 26(1) next identifies, based on the routing entry 46(0), a first teleporting service (e.g., the teleporting service 26(0)) of the first quantum computing device 14, wherein the first teleporting service 26(0) is associated with the first qubit 28(0) in the entangled state with the corresponding second qubit 28(1) associated with a second teleporting service (e.g., the teleporting service 36(0)) of the second quantum computing device 16 (block 90). The first routing service 26(1) then routes the routing request 40 to the first teleporting service 26(0) (block 92). The first teleporting service 26(0) generates, using the payload qubit 30 and the first qubit 28(0), quantum state data 48 for the payload qubit 30 (block 94). As a non-limiting example, generating the quantum state data 48 by the first teleporting service 26(0) may include performing a Bell measurement operation using the payload qubit 30 and the entangled qubit 28(0), and encoding the outcome of the Bell measurement operation as two (2) classical bits of information constituting the quantum state data 48. The first teleporting service 26(0) then sends the quantum state data 48 to the second teleporting service 36(0) via the communications network 12 (block 96). Processing in some examples then resumes at block 98 of FIG. 4C.

Turning to FIG. 4C, some examples may provide that the second teleporting service 36(0) of the second quantum computing device 16 receives the quantum state data 48 (block 98). The second teleporting service 36(0) may then apply the quantum state data 48 to the second qubit 28(1) (block 100). According to some examples, operations of block 100 for applying the quantum state data 48 to the second qubit 28(1) may comprise performing operations indicated by the quantum state data 48 to modify the second qubit 28(1) to result in a qubit that is identical to the payload qubit 30. The second teleporting service 36(0) may next send the second qubit 28(1) to a second routing service, such as the routing service 36(1), of the second quantum computing device 16 via a second quantum channel 38 of the second quantum computing device 16 (block 102). The second routing service 36(1) may then send the second qubit 28(1) to the destination service 36(2) (block 104).

Figure 5:
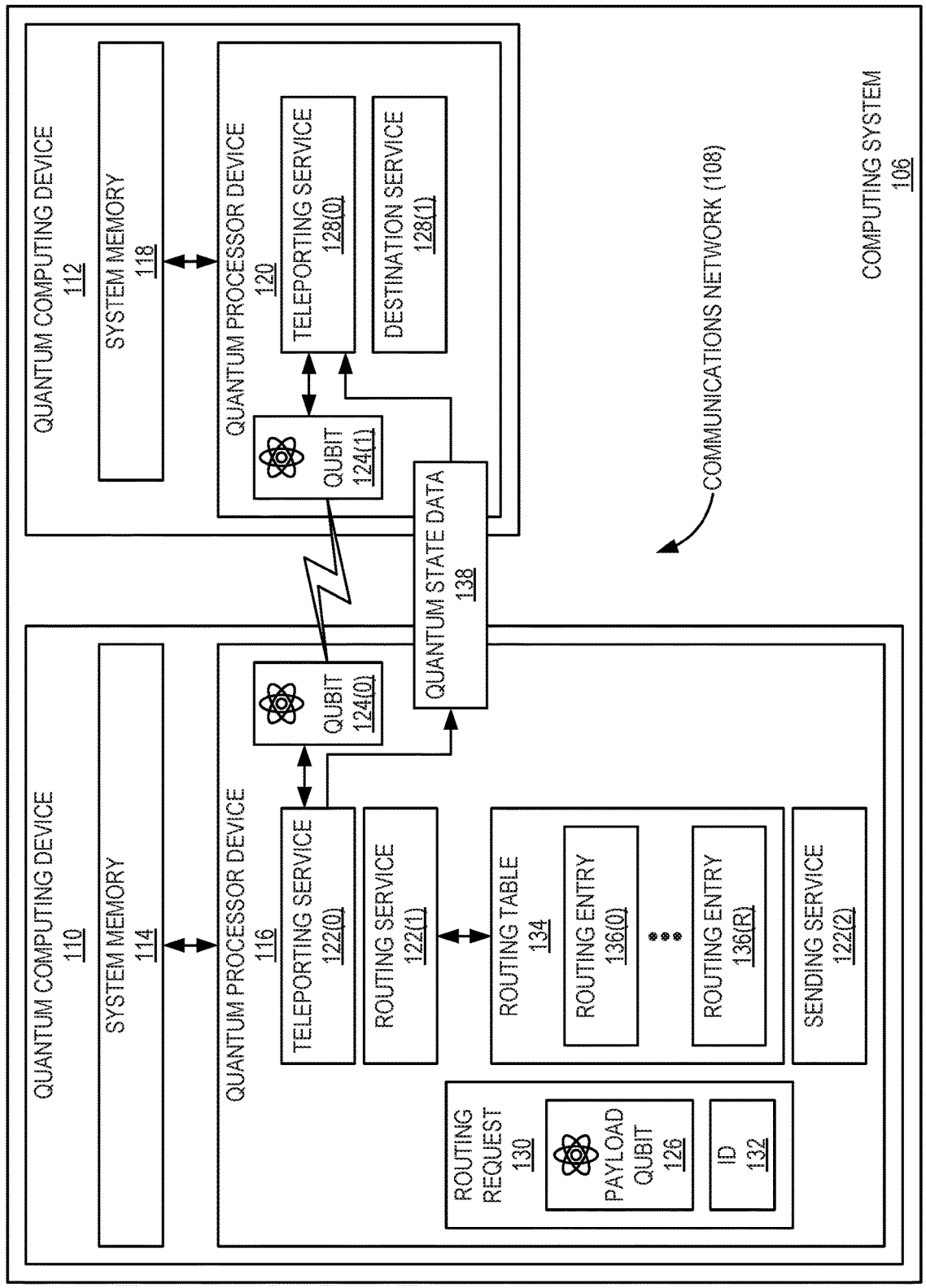
FIG. 5 is a simpler block diagram of the computing system of FIG. 1 for providing federated messaging through teleportation, according to one example.

FIG. 5 is a simpler block diagram of the computing system 10 of FIG. 1 for providing federated messaging for quantum systems using teleportation, according to one example. In FIG. 5, a computing system 106 includes a communications network 108, through which a quantum computing device 110 is communicatively coupled to a quantum computing device 112. The quantum computing device 110 includes a system memory 114 and a quantum processor device 116, while the quantum computing device 112 includes a system memory 118 and a quantum processor device 120. The quantum processor device 116 of the quantum computing device 110 provides a plurality of services 122(0)-122(2) for processing and handling qubits. The plurality of services 122(0)-122(2) include a teleporting service 122(0), a routing service 122(1), and a sending service 122(2). As seen in FIG. 5, the teleporting service 122(0) is associated with a qubit 124(0) that is in an entangled state with a qubit 124(1), and the sending service 122(2) is associated with a payload qubit 126 (i.e., a qubit to be teleported). The quantum computing device 112 also provides a plurality of services 128(0)-128(1), including a teleporting service 128(0) and a destination service 128(1).

In operation, the sending service 122(2) of the quantum computing device 110 may seek to teleport the payload qubit 126 to the destination service 128(1) of the quantum computing device 112. Accordingly, the sending service 122(2) generates a routing request 130, which includes the payload qubit 126 and an identifier ("ID") 132 of the destination service 128(1). The routing request 130 is received by the routing service 122(1). The routing service 122(1) first accesses a routing table 134 comprising a plurality of routing entries 136(0)-136(R). The routing service 122(1) identifies a routing entry corresponding to the destination service 128(1) among the plurality of routing entries 136(0)-136(R) in the routing table 134. Based on the identified routing entry, the routing service 122(1) then identifies the teleporting service 122(0) as being associated with the qubit 124(0) that is entangled with the qubit 124(1) of the quantum computing device 112 on which the destination service 128(1) resides. The routing service 122(1) next routes the routing request 130 to the teleporting service 122(0). Upon receiving the routing request 130, the teleporting service 122(0) uses the payload qubit 126 and the entangled qubit 124(0) to generate quantum state data 138 for the payload qubit 126. The teleporting service 122(0) then sends the quantum state data 138 to the quantum computing device 112 via the communications network 108.

Figure 6:
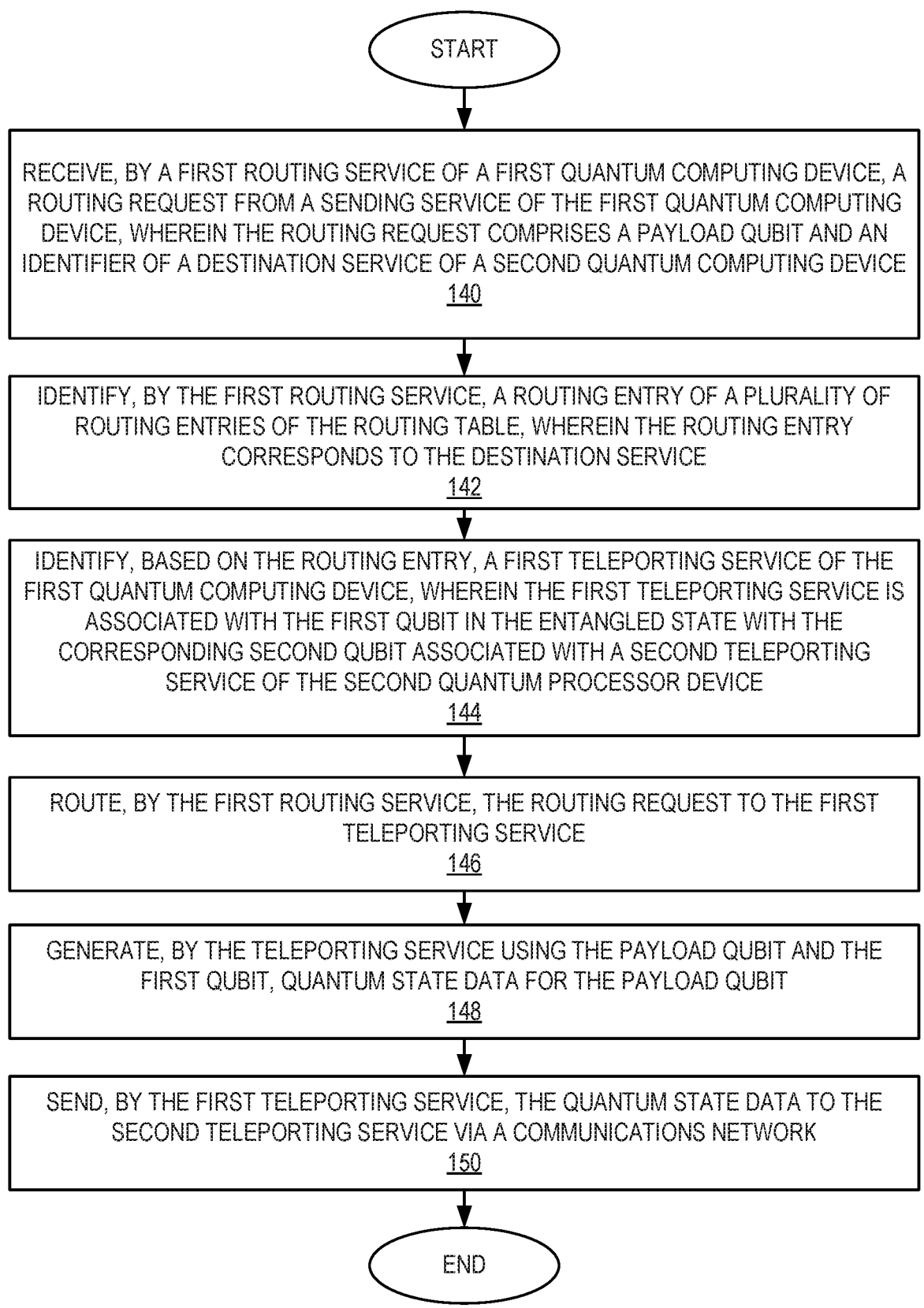
FIG. 6 is a flowchart of a simplified method for providing federated messaging through teleportation using the computing system of FIG. 5, according to one example.

FIG. 6 is a flowchart of a simplified method for providing federated messaging using teleportation. Elements of FIG. 5 are referenced in describing FIG. 6, for the sake of clarity. In FIG. 6, operations begin with the first routing service 122(1) receiving a routing request, such as the routing request 130, from a sending service (e.g., the sending service 122(2)) of the first quantum computing device 110, wherein the routing request 130 comprises a payload qubit 126 and an identifier 132 of a destination service of a second quantum computing device (e.g., the destination service 128(1) of the quantum computing device 112) (block 140). The first routing service 122(1) identifies a routing entry, such as the routing entry 136(0), of the routing table 134, wherein the routing entry 136(0) corresponds to the destination service 128(1) (block 142).

The first routing service 122(1) next identifies, based on the routing entry 136(0), a first teleporting service (e.g., the teleporting service 122(0)) of the first quantum computing device 110, wherein the first teleporting service 122(0) is associated with the first qubit 124(0) in the entangled state with the corresponding second qubit 124(1) associated with a second teleporting service (e.g., the teleporting service 128(0)) of the second quantum computing device 112 (block 144).

The first routing service 122(1) then routes the routing request 130 to the first teleporting service 122(0) (block 146). The first teleporting service 122(0) generates, using the payload qubit 126 and the first qubit 124(0), quantum state data 138 for the payload qubit 126 (block 148). The first teleporting service 122(0) then sends the quantum state data 138 to the second teleporting service 128(0) via the communications network 108 (block 150).

Figure 7:
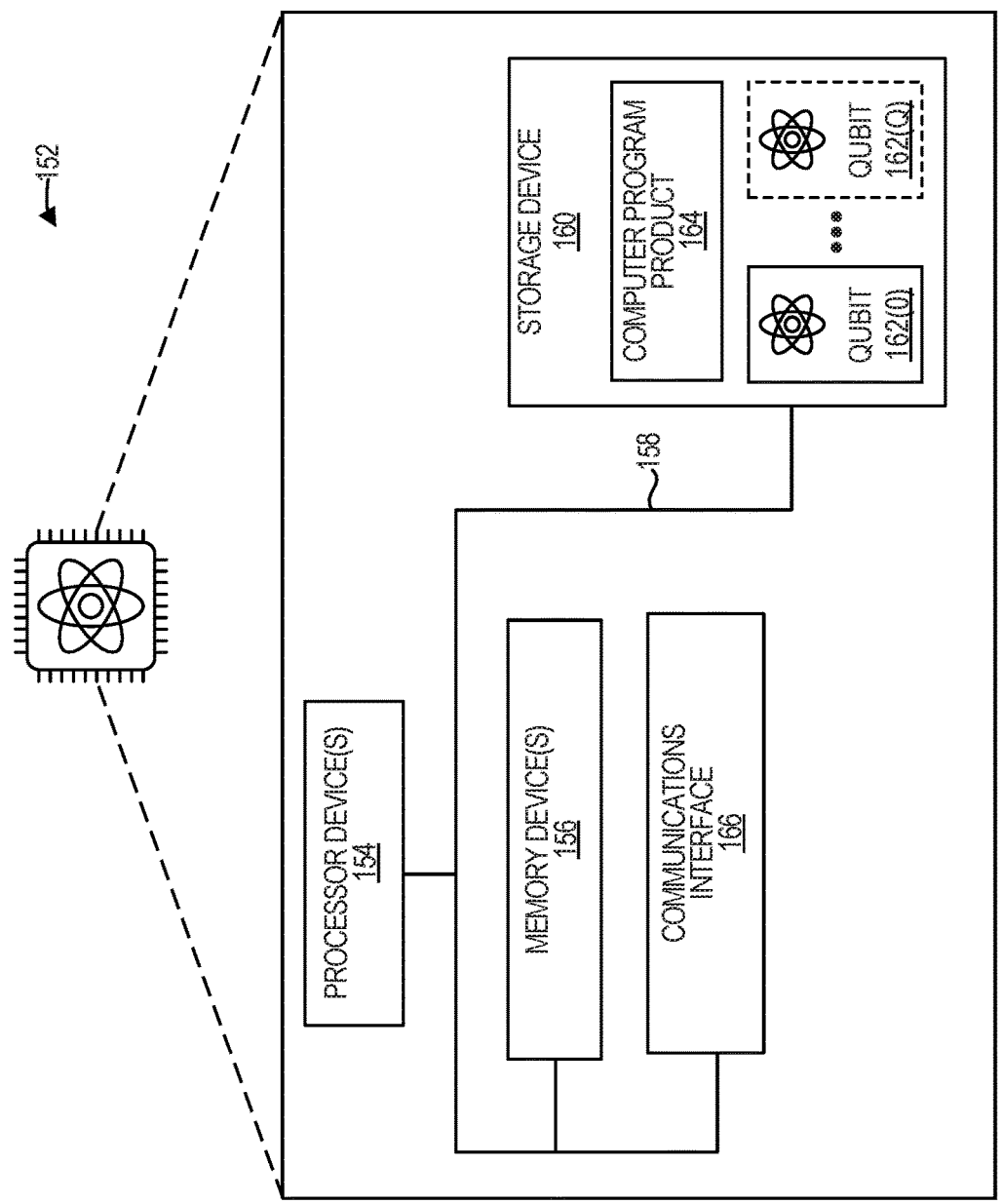
FIG. 7 is a block diagram of a quantum computing device suitable for implementing examples, according to one example.

FIG. 7 is a block diagram of a quantum computing device 152, such as the quantum computing device 14 and the quantum computing device 16 of FIG. 1, suitable for implementing examples according to one example. The quantum computing device 152 may comprise any computing or electronic device capable of including firmware, hardware, and/or executing software instructions to implement the functionality described herein in a quantum environment. The quantum computing device 152 includes the one or more processor devices 154, the one or more memory devices 156, and a system bus 158. The system bus 158 provides an interface for system components including, but not limited to, the one or more memory devices 156 and the one or more processor devices 154. The processor devices 154 can be any commercially available or proprietary processor suitable for operating in a quantum environment. The quantum computing device 152 may further include or be coupled to a non-transitory computer-readable storage medium such as a storage device 160. The storage device 160 and other drives associated with computer-readable media and computer-usable media may provide non-volatile storage of data, data structures, computer-executable instructions, and the like. The storage device 160 may also store one or more qubits 162(0)-162(Q), which may be measured and/or manipulated by the one or more processor devices 154 when performing quantum computing operations.

All or a portion of the examples may be implemented as a computer program product 164 stored on a transitory or non-transitory computer-usable or computer-readable storage medium, such as the storage device 160, which includes complex programming instructions, such as complex computer-readable program code, to cause the one or more processor devices 154 to carry out the steps described herein. Thus, the computer-readable program code can comprise software instructions for implementing the functionality of the examples described herein when executed on the one or more processor devices 154.

An operator may also be able to enter one or more configuration commands through a keyboard (not illustrated), a pointing device such as a mouse (not illustrated), or a touch-sensitive surface (not illustrated). The quantum computing device 152 may also include a communications interface 166 suitable for communicating with other computing devices, including, in some implementations, classical computing devices.

The examples also facilitate an improvement to computer functionality itself by providing a federated messaging mechanism to intelligently route quantum information transmitted over a communications network among quantum computing devices, resulting in improved functionality of computing devices on the communications network. Thus, the examples are directed to specific improvements in computer functionality.

What is claimed is:

1. A method, comprising:
   populating, by a first routing service of a first quantum computing device, a routing table based on one or more Quantum Assembly (QASM) files received from a corresponding one or more services of the first quantum computing device;
   receiving, by the first routing service, a routing request from a sending service of the first quantum computing device, wherein the routing request comprises a payload qubit and an identifier of a destination service of a second quantum computing device;
   identifying, by the first routing service, a routing entry of a plurality of routing entries of the routing table, wherein the routing entry corresponds to the destination service;
   identifying, based on the routing entry, a first teleporting service of the first quantum computing device, wherein the first teleporting service is associated with a first qubit in an entangled state with a corresponding second qubit associated with a second teleporting service of the second quantum computing device;
   routing, by the first routing service, the routing request to the first teleporting service;
   generating, by the first teleporting service using the payload qubit and the first qubit, quantum state data for the payload qubit; and
   sending, by the first teleporting service, the quantum state data to the second teleporting service via a communications network;
   wherein each routing entry of the plurality of routing entries corresponds to a qubit among a plurality of qubits including the first qubit, the second qubit, and the payload qubit.

2. The method of claim 1, wherein the quantum state data comprises two (2) classical bits encoding the outcome of a Bell measurement operation on the payload qubit and the first qubit.

3. The method of claim 1, further comprising, prior to receiving the routing request, inducing the entangled state between the first qubit and the second qubit.

4. The method of claim 1, wherein receiving the routing request comprises receiving the routing request via a first quantum channel comprising a message bus configured to transport qubits and classical bits.

5. The method of claim 1, further comprising:
   receiving, by the second teleporting service of the second quantum computing device, the quantum state data; and
   applying, by the second teleporting service, the quantum state data to the second qubit.

6. The method of claim 5, further comprising:
   sending, by the second teleporting service, the second qubit to a second routing service of the second quantum computing device via a second quantum channel of the second quantum computing device; and
   sending, by the second routing service, the second qubit to the destination service.

7. The method of claim 1, wherein-each routing entry of the plurality of routing entries comprises:
   an identifier of a service associated with the qubit;
   an identifier of the qubit;
   an identifier of a quantum computing device of the service;
   an indicator of an entanglement state of the qubit; and
   an identifier of a quantum computing device associated with an entangled qubit, if any.

8. A computing system, comprising:
   a first quantum computing device, comprising:
      a first system memory; and
      a first quantum processor device coupled to the first system memory; and
   a second quantum computing device, comprising:
      a second system memory; and
      a second quantum processor device coupled to the second system memory;
   the first quantum processor device is to:
      populate, using a first routing service of the first quantum processor device, a routing table based on one or more Quantum Assembly (QASM) files received from a corresponding one or more services of the first quantum processor device;
      receive, using the first routing service, a routing request from a sending service of the first quantum processor device, wherein the routing request comprises a payload qubit and an identifier of a destination service of the second quantum processor device;
      identify, using the first routing service, a routing entry of a plurality of routing entries of the routing table, wherein the routing entry corresponds to the destination service;
      identify, based on the routing entry, a first teleporting service of the first quantum processor device, wherein the first teleporting service is associated with a first qubit in an entangled state with a corresponding second qubit associated with a second teleporting service of the second quantum processor device;

route, using the first routing service, the routing request to the first teleporting service;

generate, using the teleporting service using the payload qubit and the first qubit, quantum state data for the payload qubit; and send, using the first teleporting service, the quantum state data to the second teleporting service via a communications network;

wherein each routing entry of the plurality of routing entries corresponds to a qubit among a plurality of qubits including the first qubit, the second qubit, and the payload qubit.

9. The computing system of claim 8, wherein the quantum state data comprises two (2) classical bits encoding the outcome of a Bell measurement operation on the payload qubit and the first qubit.

10. The computing system of claim 8, wherein the first quantum processor device is further to, prior to receiving the routing request, induce the entangled state between the first qubit and the second qubit.

11. The computing system of claim 8, wherein:
the first quantum processor device comprises a first quantum channel comprising a message bus to transport qubits and classical bits; and
to receive the routing request is to receive the routing request via the first quantum channel.

12. The computing system of claim 8, wherein the second quantum processor device is to:
receive, using the second teleporting service of the second quantum processor device, the quantum state data;
apply, using the second teleporting service, the quantum state data to the second qubit.

13. The computing system of claim 12, wherein the second quantum processor is further to:
send, using the second teleporting service, the second qubit to a second routing service of the second quantum processor device via a second quantum channel of the second quantum processor device;
send, using the second routing service, the second qubit to the destination service.

14. The computing system of claim 8, wherein each routing entry of the plurality of routing entries comprises:
an identifier of a service associated with the qubit;
an identifier of the qubit;
an identifier of a quantum computing device of the service;
an indicator of an entanglement state of the qubit; and
an identifier of a quantum computing device associated with an entangled qubit, if any.

15. A computer program product stored on a non-transitory computer-readable storage medium and including instructions to cause a quantum processor device to:
populate, by a first routing service, a routing table based on one or more Quantum Assembly (QASM) files received from a corresponding one or more services of the quantum processor device;
receive, by the first routing service, a routing request from a sending service of the quantum processor device, wherein the routing request comprises a payload qubit and an identifier of a destination service of a second quantum processor device;
identify, by the first routing service, a routing entry of a plurality of routing entries of the routing table, wherein the routing entry corresponds to the destination service;
identify, based on the routing entry, a first teleporting service of the quantum processor device, wherein the first teleporting service is associated with a first qubit in an entangled state with a corresponding second qubit associated with a second teleporting service of the second quantum processor device;
route, by the first routing service, the routing request to the first teleporting service;
generate, by the first teleporting service using the payload qubit and the first qubit, quantum state data for the payload qubit; and
send, by the first teleporting service, the quantum state data to the second teleporting service via a communications network;
wherein each routing entry of the plurality of routing entries corresponds to a qubit among a plurality of qubits including the first qubit, the second qubit, and the payload qubit.

16. The computer program product of claim 15, wherein the quantum state data comprises two (2) classical bits encoding the outcome of a Bell measurement operation on the payload qubit and the first qubit.

17. The computer program product of claim 15, further including instructions to cause the quantum processor device to, prior to receiving the routing request, induce the entangled state between the first qubit and the second qubit.

* * * * *